(12) United States Patent
Winter

(10) Patent No.: US 6,761,071 B2
(45) Date of Patent: Jul. 13, 2004

(54) METHOD AND DEVICE FOR MEASURING DIMENSIONS OF HOLLOW SPACES AND GAPS

(75) Inventor: Franz Winter, Knesebeck (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/058,523

(22) Filed: Jan. 28, 2002

(65) Prior Publication Data

US 2002/0100328 A1 Aug. 1, 2002

(30) Foreign Application Priority Data

Jan. 26, 2001 (DE) .......................................... 101 03 558

(51) Int. Cl.⁷ .............................................. G01N 29/00
(52) U.S. Cl. .......................................... 73/649; 73/661
(58) Field of Search ......................... 73/649, 643, 644, 73/661, 575

(56) References Cited

U.S. PATENT DOCUMENTS

| | | | |
|---|---|---|---|
| 3,741,003 A | * 6/1973 | Gunkel | 73/637 |
| 3,771,354 A | * 11/1973 | Miller | 73/67.7 |
| 4,014,211 A | * 3/1977 | Araki et al. | 73/861.27 |
| 4,194,400 A | 3/1980 | Staff | 73/623 |
| 4,491,137 A | 1/1985 | Jingu | 128/660 |
| 4,782,701 A | * 11/1988 | Proctor, Jr. | 73/587 |
| 5,123,275 A | * 6/1992 | Daoud et al. | 73/19.03 |
| 5,391,887 A | * 2/1995 | Murray, Jr. | 250/506.1 |
| 5,462,059 A | * 10/1995 | Ferrara et al. | 600/455 |
| 5,732,706 A | * 3/1998 | White et al. | 600/437 |
| 5,771,896 A | * 6/1998 | Sliwa et al. | 600/462 |
| 5,907,099 A | * 5/1999 | Huang et al. | 73/597 |
| RE37,065 E | * 2/2001 | Grahn | 73/628 |
| 6,397,656 B1 | * 6/2002 | Yamaguchi et al. | 73/1.82 |

FOREIGN PATENT DOCUMENTS

| | | |
|---|---|---|
| DE | 28 54 529 | 7/1979 |
| DE | 33 29 041 A1 | 2/1984 |
| FR | 2 602 043 | 1/1988 |

* cited by examiner

*Primary Examiner*—Hezron Williams
*Assistant Examiner*—Jacques M Saint-Surin

(57) ABSTRACT

A method and a device for measuring dimensions of gaps and hollow spaces in motor vehicle body construction use a filler element which is introduced in a gap or a hollow space to be measured. The filler element is coupled to an ultrasonic testing device for accurately and consistently measuring the gap or hollow space.

8 Claims, 2 Drawing Sheets

METHOD AND DEVICE FOR MEASURING DIMENSIONS OF HOLLOW SPACES AND GAPS

BACKGROUND OF THE INVENTION

Field of the Invention

The invention relates to a method and a device for measuring dimensions of gaps and hollow spaces in motor vehicle body construction.

In vehicle body construction, gaps and hollow spaces are formed when joining individual contoured components together to form a whole vehicle body. These gaps and hollow spaces have to be measured. Particular attention must be paid to the dimensions of gaps and hollow spaces inside a vehicle body or at vehicle body regions against which either attachments or in particular seals are to be fitted. Further, a vehicle body cooperates with and corresponds to parts that are mounted as a part of the outer body shell. The vehicle body especially corresponds to or cooperates with moving parts such as doors, gates, hinged covers and flaps. When fitting these moving parts such as doors, covers and flaps, gap dimensions are important, firstly because they must implicitly contain a structural tolerance, but at the same time also because they must conform to standardized seal profiles in such a way that the desired sealing effect is obtained when being in a closed state.

In practice, door gap dimensions are determined through the use of feeler gages to within 0.1 mm. The feeler gages used for this purpose are so-called parallel feelers, which, however, are only suitable for measuring parallel surfaces. Such parallel-aligned surfaces rarely occur, however, so that a more precise measurement is needed in the case of variable gap dimensions.

In order to determine these gap dimensions on the actual object an X-ray examination may be undertaken, which requires a correspondingly expensive measuring set-up. Such an X-ray examination requires a ring-shaped measurement set-up which must surround the area to be analyzed in an annular manner. This set-up is however only possible when the components to be analyzed have relatively small component dimensions.

A further disadvantage in the case of X-ray examination is the need for a separate test booth to protect the test personnel from radiation. This makes such a procedure rather expensive, especially for motor vehicle manufacture, and particularly in this case where a contrast medium has to be used, which must for example correspond to the seal element which is subsequently pressed into the set position. For this purpose, various sections produced from a modeling compound are inserted into the corresponding hollow space, clearance, joint or gap.

A disadvantage is that methods of this type are too expensive and due to the X-ray radiation, moreover, may pose a risk to the health of the operating personnel.

SUMMARY OF THE INVENTION

It is accordingly an object of the invention to provide a method and a device for measuring gaps and hollow spaces which overcome the above-mentioned disadvantages of the heretofore-known methods and devices of this general type and which allow to acquire dimensions of gaps, hollows spaces or clearances accurately and consistently using simple measures.

With the foregoing and other objects in view there is provided, in accordance with the invention, a method for measuring gaps and hollow spaces in motor vehicle body construction, the method includes the steps of:

introducing a filler element into a gap or a hollow space; and measuring the gap or the hollow space by using an ultrasonic testing unit coupled to the filler element.

The method according to the invention is based on the idea of introducing a filler element, which is coupled to an ultrasonic testing device, into a hollow space, clearance or gap to be measured. The method according to the invention poses no health risks, because it uses an ultrasonic measuring method. Also, the method according to the invention measures the specific geometries of gaps or hollow spaces with great accuracy, even when the geometries do not have parallel boundaries.

According to an advantageous mode of the invention, the filler element is a sealing element in the form of a sealing strip or weather strip. If the ultrasonic probe is pointed, the point of the ultrasonic probe can be inserted or stuck into the seal that is already put in place and the dimension of the gap or hollow space at this location can then be determined. It is important to size the dimensions of the gaps, hollow spaces or clearances, including a given manufacturing tolerance, as well as the cross sectional profile of the seal, which is to be inserted, such that the seal is in any case suitably compressed or pressed into a sealing contact in order to achieve an optimum sealing effect.

A particular example of this are the door seals or weather strips used where gaps occur between the moveable body parts, that is the door frame parts and the pillar elements of the body, which have to be dimensioned as described in order to achieve a corresponding sealing effect. In order to obtain optimally coordinated dimensions for this purpose, these dimensions of the hollow spaces, clearances or gaps must be suitably inspected.

According to a further mode of the invention, the dimensions of the gaps or hollow spaces are measured through the use of a filler element in the manner of a medical intravascular ultrasonic measurement. This method of measurement advantageously uses existing experience and knowledge on how to interpret ultrasonic images.

According to a further mode of the invention, the measurement is analyzed with a local or spatial resolution by using a corresponding signal processing, wherein it is possible either to position the ultrasonic probe as centrally as possible in the filler element, where a corresponding cross-sectional contour is to be determined, or to carry out a suitable electronic processing in such a way that even an asymmetrical positioning of the ultrasonic probe in the filler element is of no significance, and depth profiles can still be represented.

With the objects of the invention in view there is also provided, a device for measuring gaps and hollow spaces in motor vehicle body construction, including:

an ultrasonic testing unit having an ultrasonic probe; and a filler element configured to be introduced in a gap or a hollow space to be measured, the filler element enclosing the ultrasonic probe.

With regard to the device according to the invention, the essence of the invention is that the filler element encloses the ultrasonic probe of the ultrasonic testing unit, and that the filler element can then be introduced into the hollow space or gap to be measured. The probe is thereby enclosed by a corresponding filler element, that is then inserted into the profile of the hollow space or gap to be measured.

For this purpose it is advantageous if the ultrasonic probe as such is provided with a rod-shaped tip so that it can penetrate into corresponding gaps of smaller dimensions.

In further advantageous embodiments, various filler elements may be used. The filler element may be composed of an elastomer, which molds to the corresponding shape of the gap or hollow space.

Alternatively, however, the filler element may be composed of a plastomer, which permanently takes on the shape of the external contour of the hollow space or gap to be measure and plastically reproduces the contour.

According to another feature of the invention, however, the filler element may be formed with a dimensionally unstable body, which does not retain its shape. This type of filler element may be embodied as a liquid-filled or paste-filled, balloon-like body. This balloon-like body filled with liquid or paste is now capable of conforming to any shape of hollow spaces or gaps, or of molding itself to the corresponding external contours, so that the subsequent ultrasonic measurement produces a very accurate image of the contour or dimensions of the gap or hollow space. The liquids or pasty materials used for this purpose may be of such a nature that they produce a correspondingly high-contrast image when performing a signal processing.

According to another feature of the invention, the filler element may be configured as an expansion element. This is a further advantageous embodiment, where not only elastic or compressible characteristics of balloon-like filler elements are present, but where the filler element can also be modified in its size and shape. This means that the filler element can not only mold itself to a contour but can also vary in its shape and overall volume. For this purpose the expansion element can then be controllably filled with liquids, for example, and the balloon-like casing or outer layer thereof will then permit an expansion or dilatation within certain limits.

In this way dimensions of gaps and hollow spaces can be optimally determined. The ultrasonic probe can also still be moved in its entirety inside the filler element, so that it can be brought into a correspondingly optimum spatial position, for example a position that is as central as possible. However, an eccentric positioning of the probe inside the filler element is also possible if a corresponding electronic processing of the contrast image is performed.

Other features which are considered as characteristic for the invention are set forth in the appended claims.

Although the invention is illustrated and described herein as embodied in a method and a device for measuring dimensions of gaps, hollow spaces or clearances, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
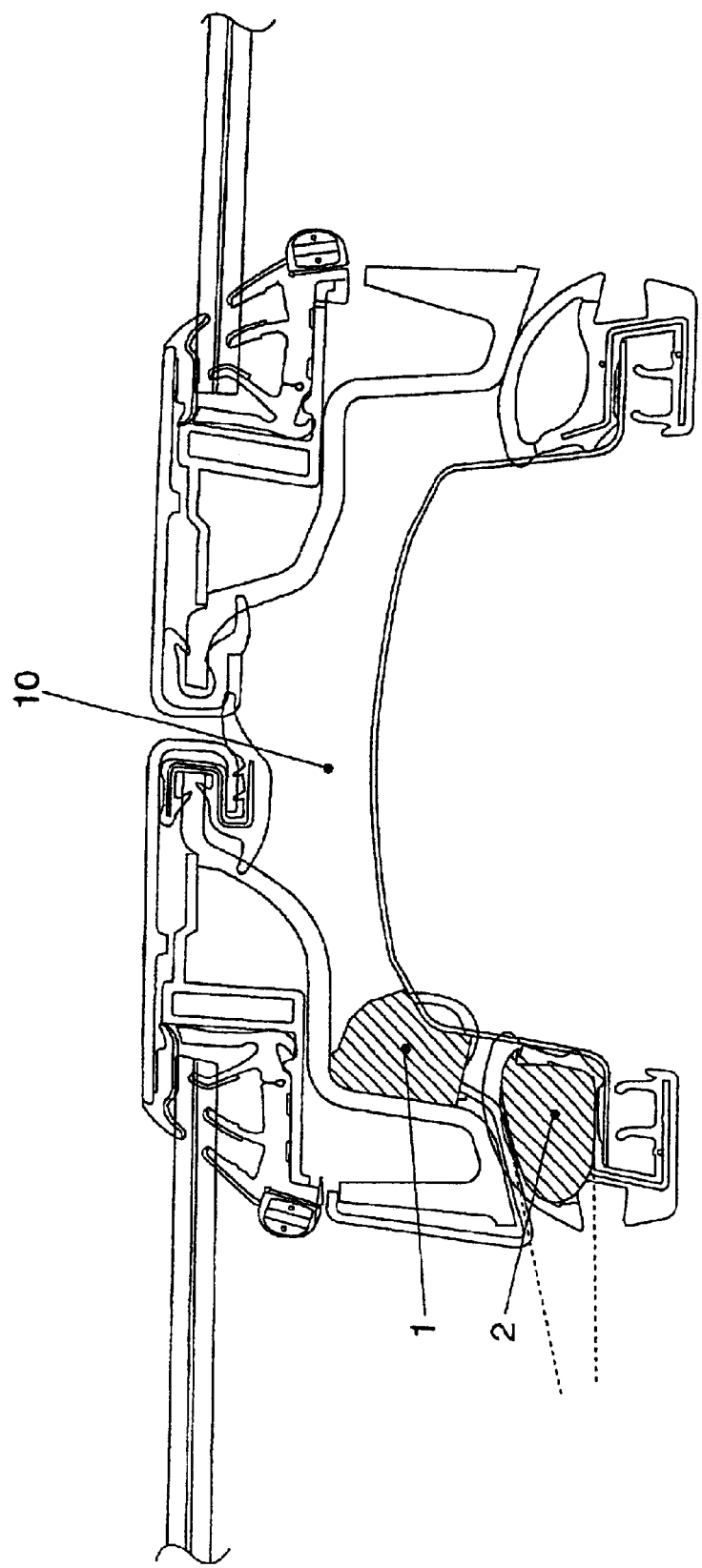
FIG. 1 is a partial sectional view of a B-pillar in a motor vehicle.

Referring now to the figures of the drawings in detail and first, particularly, to FIG. 1 thereof, there is shown a section through a so-called B-pillar 10 of a motor vehicle body. Within this region, seals 1, 2 are to be inserted, which are to be optimally fitted in corresponding alignment such that they conform to the corresponding gap dimensions and hollow space dimensions. That is to say, in the finished, inserted position of the seals 1, 2, they must permit a corresponding degree of compression. In other words, the door, when closed, must compress the seals 1, 2 so that an optimum sealing effect is achieved. The zones represented here show cross-sectional areas for specific contours of hollow spaces and gaps. These contours can then be optimally determined along the entire gap by using the device according to the invention or the method according to the invention.

A filler element inserted is to be introduced into the corresponding gap in the area of the seals 1, 2. A corresponding filling of a filler element or an elastic formability of a filler element or an adaptation to a given contour by a filler element of unstable dimensions then allows the filler element to mold into the contour represented here. An ultrasonic probe which is disposed within the contour or inserted into the contour determines the contour of the filler element when it is in a set position of use as represented. The dimensions can hereby be determined with extreme accuracy by corresponding technical analyses of the signals.

Figure 2:
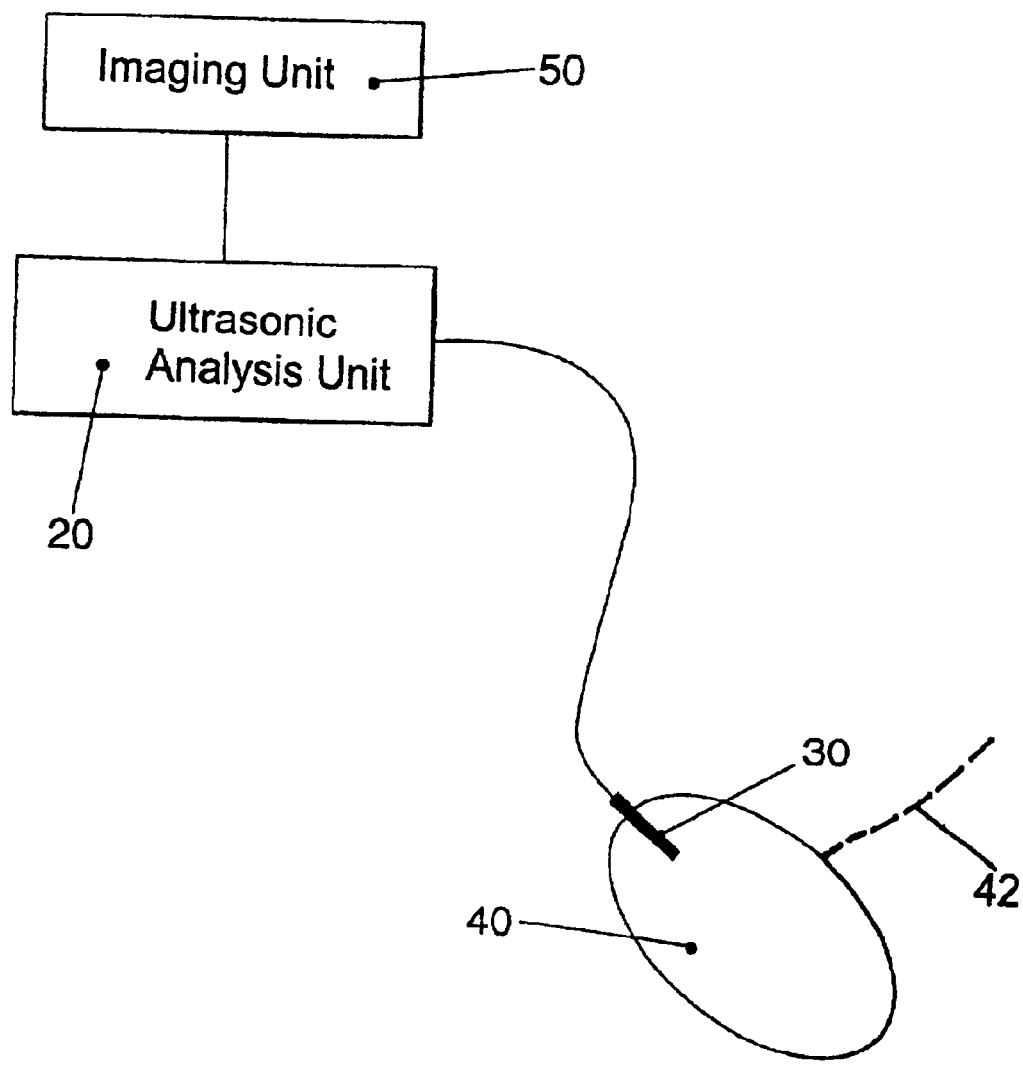
FIG. 2 is a schematic diagram for illustrating the main elements of the device according to the invention.

FIG. 2 is a schematic representation of the main elements of the device according to the invention. The central element is an ultrasonic analysis unit 20, which is coupled to an ultrasonic probe 30. The ultrasonic probe 30 contains both the ultrasonic transmitter and the ultrasonic receiver, a transmission and receiving mode also being feasible with one and the same ultrasonic generator, which is simultaneously both the transmitter and the detector, signals only being generated in different time windows and reflection signals being detected in a corresponding other time window. These signals are then registered and analyzed by the analysis unit 20. A calculation covering the entire contour is performed such that the calculation determines the shape as well as the precise dimensions of the filler element 40 enclosing the ultrasonic probe 30. In an imaging unit 50, connected to the analysis unit on the output side, a corresponding image is then generated from the calculated data, which firstly permits a qualitative evaluation of the hollow space or gap, but which can also be provided with a corresponding scale on the basis of which a geometric dimensioning of the filling contour can be performed.

The filler element 40 may be a shape-retaining elastomeric or plastomeric element or may be a balloon-like element that does not retain its shape. In the case where the filler element is an expansion element which has an altogether dimensionally unstable external contour and which encloses the ultrasonic probe 30, the expansion element can now in the correspondingly inserted positions mold itself optimally into the hollow space, clearance or gap. Subsequently a corresponding measurement is performed with the ultrasonic probe. The expansion element as such may contain a supply line and an outlet line in order to pump in filling liquids or pasty filler materials in order to enlarge the volume or to let these filling materials out again in order to reduce the volume. A broken line 42 schematically indicates a supply line for pumping a filling material into the filling element 40. In this way, an optimum adaptation to the door gap area or hollow space to be measured is achieved. At the same time the casing of the expansion element may be formed from a highly elastic, rubber-like material, which on the one hand permits extreme deformation loads, but on the other also permits an expansion of the volume in addition to the deformation.

I claim:

1. A method for measuring gaps and hollow spaces in motor vehicle body construction, the method which comprises:

introducing a filler element into one of a gap and a hollow space in a motor vehicle body, the one of the gap and the hollow space having a given dimension, the filler element being an element selected from the group consisting of a compressible sealing strip, an elastomeric filler element, a plastomeric filler element, an expansion element, and a dimensionally unstable body;

providing a probe of an ultrasonic testing unit such that the filler element encloses the probe; and measuring the given dimension of the one of the gap and the hollow space by using the ultrasonic testing unit.

2. The method according to claim 1, which comprises: using, as the filler element, the compressible sealing strip; and performing the step of providing the probe of the ultrasonic testing unit such that the filler element encloses the probe by inserting the probe of the ultrasonic testing unit into the compressible sealing strip.

3. The method according to claim 1, which comprises performing the measuring step by using a measurement process as is used for a medical, intravascular ultrasonic measurement.

4. The method according to claim 3, which comprises evaluating a measurement, resulting from the measuring step, with a given resolution by using a signal processing step.

5. The method according to claim 1, which comprises determining dimensions of the one of the gap and the hollow space.

6. A device for measuring gaps and hollow spaces in motor vehicle body construction, comprising:

an ultrasonic testing unit having an ultrasonic probe;

a filler element configured to be introduced in one of a gap and a hollow space in a motor vehicle body, the one of the gap and the hollow space having a given dimension to be measured, said filler element enclosing said ultrasonic probe, and said filler element being an element selected from the group consisting of a compressible sealing strip, an elastomeric filler element, a plastomeric filler element, an expansion element, and a dimensionally unstable body; and said ultrasonic testing unit being configured to measure the given dimension of the one of the gap and the hollow space.

7. The device according to claim 6, wherein said ultrasonic probe has a rod-shaped tip.

8. The device according to claim 6, wherein said dimensionally unstable body is a balloon element filled with a material selected from the group consisting of a liquid material and a paste material.

* * * * *